J. Hawkes,
Tag.

No. 42,729.  Patented May 10, 1864.

Witnesses
Lemuel W. Serrell
Chas. H. Smith

J. W. Hawkes

UNITED STATES PATENT OFFICE.

JOHN HAWKS, OF BROOKLYN, NEW YORK, ASSIGNOR TO HENRY HAWKS, OF SAME PLACE.

TAG-HOOK.

Specification forming part of Letters Patent No. 42,729, dated May 10, 1864.

*To all whom it may concern:*

Be it known that I, JOHN HAWKS, of Brooklyn, in the county of Kings and State of New York, have invented, made, and applied to use a certain new and Improved Means for Attaching Tags and Labels; and I do hereby declare the following to be a full, clear, and exact description of the same, reference being had to the annexed drawings, making part of this specification, wherein—

Figure 1:
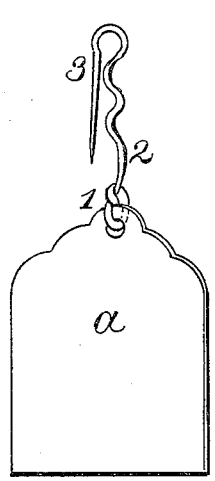
Figure 2:
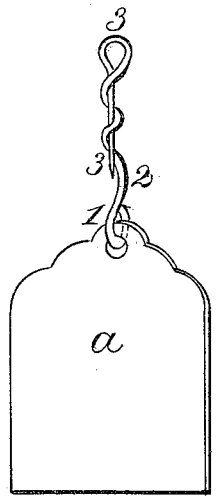
Figure 3:
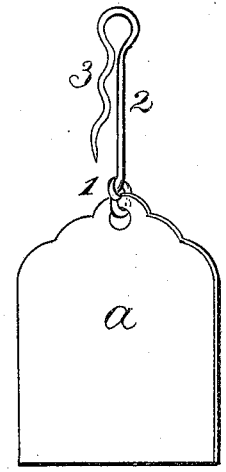

Figure 1 is an elevation of my attachment upon a tag ready for connecting the same to a bale, bundle, roll, or other article. Fig. 2 represents the attachment in the form it assumes after being secured to the given article, and Fig. 3 is a slight variation in the said attachment.

Similar marks of reference denote the same parts.

Tags and labels have heretofore been affixed by a wire having a hook that can be entered into the bundle. These are liable to become detached and cause considerable trouble.

The nature of my said invention consists in a metallic twisted or spiral hook attachment, so shaped that after the attachment has been hooked through or into the article the shank of the attachment can be rotated around the hook or the hook around the shank, the parts springing sufficiently for that purpose until the shank and hook are confined to each other, but capable of easy disconnection without injury, so that the attachment can be used as often as desired for attaching tags or other articles, or allowing them to be detached.

In the drawings the wire attachments are shown larger than the usual size for greater clearness of representation.

$a$ represents a tag or label united to the attachment $b$ by the eye 1, that may simply be bent around, as in Fig. 2, or made as a loop around the shank 2, as seen in Fig. 1. The wire forming the shank is bent or twisted in an open screw or spiral form, as represented in Figs. 1 and 2; and 3 is the hook of the attachment. After the hook has been passed through the article to which the tag or label is to be affixed while open, as in Fig. 1, the point of the hook and shank 2 are to be rotated around each other, which causes the hook to assume the position shown in Fig. 2 within the twists of the wire and firmly retained there, so that the tag and attachment cannot be disconnected, except by a reverse rotation of the hook and shank of the attachment.

It will be evident that the hook might be twisted in the open screw form, as represented in Fig. 3, and the shank 2 be plain; but I prefer the form represented in Figs. 1 and 2.

What I claim, and desire to secure by Letters Patent, is—

The metallic-hook attachment for tags and labels, consisting of the spiral or screw formed portion receiving the straight or nearly straight part, as and for the purposes specified.

In witness whereof I have hereunto set my signature this 16th day of February, 1864.

JNO. HAWKS.

Witnesses:
LEMUEL W. SERRELL,
CHAS. H. SMITH.